Patented Oct. 30, 1951

2,572,855

UNITED STATES PATENT OFFICE 2,572,855

BACTERICIDAL COMPOSITIONS

Hubert G. Guy, Pittsburgh, Pa., assignor to Koppers Company, Inc., Pittsburgh, Pa., a corporation of Delaware No Drawing. Application November 19, 1947,
Serial No. 787,027

18 Claims. (Cl. 167—31)

This invention relates to the control of pestiferous microorganisms and is particularly directed to new and improved bactericidal compositions containing as an essential active ingredient an unsubstituted higher weight phenol of the benzene series having at least one hydrocarbon substituent containing at least three carbon atoms in synergistic combination with methyl naphthalene at least 25% of which is the alpha isomer.

The higher molecular weight alkyl, aryl and aralkyl phenols such as propyl and isopropyl phenols, tert-butyl phenol, tert-butyl-meta-cresol, o-amyl phenol, o-phenyl phenol, and ortho- and para-benzyl phenols and para-tert-amyl phenol are known to have high bactericidal value as compared with the lower molecular weight phenols. Such phenols, however, are difficult to formulate and in many cases the increased efficacy is not sufficient to justify the increased cost of preparation of useful disinfectants or antiseptics.

I have now found that these phenols may readily be formulated as water dispersible disinfactants or antiseptics by including in the formulation a suitable proportion of methyl naphthalene at least 25% of which is the alpha isomer. In addition, I have found that when the methyl naphthalene is properly proportioned to the phenol there is obtained an extraordinarily marked increase in bactericidal action.

The proportions which I have found most suitable to promote synergistic effects are about 5 parts of the methyl naphthalene for every 3 parts of the phenol. Higher and lower proportions may be used, and it appears that the most satisfactory results are obtained within the proportions of about 1 to about 2½ parts of the methyl naphthalene for every part of the phenol.

The invention may be more fully understood by reference to the compositions and results tabulated in the following table: The parts are by weight unless otherwise specified. It will be observed that compositions in accordance with the invention show phenol coefficients ranging from 70 to 255 with the proportions ranging from ½ to 4 parts of methyl naphthalene for each part of phenol. The phenol coefficients are based upon the concentration of the phenol alone. It will be observed that phenol coefficients of 115 or better are obtained with the compositions containing between 1 and 2.4 parts of methyl naphthalene for each part of phenol and that phenol coefficients between 160 and 255 are obtained with compositions ranging between 1 and 2 parts of methyl naphthalene for each part of phenol.

| Ingredients | Percentage Composition | | | | | | | | | | | | | | |
|---|---|---|---|---|---|---|---|---|---|---|---|---|---|---|---|
| | I | II | III | IV | V | VI | VII | VIII[1] | IX | X | XI | XII | XIII[1] | XIV[2] | XV[2] |
| Methyl Naphthalene | 47.2 | 48.2 | 47.7 | 54.3 | 30.6 | 28.0 | 24.9 | 42.7 | 26.2 | 63.2 | | | | | |
| Phenol | | | | | | | | | | | | | | | |
| 4-tert.-butyl-m-cresol | 29.4 | | 29.7 | 21.6 | 19.1 | 21.7 | 24.9 | 29.4 | 52.5 | 15.3 | 100 | | 50 | 100 | |
| o-phenyl phenol | | 29.7 | | | | | | | | | | 100 | | | |
| P-chloro-m-xylenol | | | | | | | | | | | | | 50 | | 100 |
| Emulsifier | | | | | | | | | | | | | | | |
| Castor Oil | 11.5 | 11.6 | | 1.3 | | | | 11.5 | | 10.3 | | | | | |
| NaOH | 1.6 | 1.6 | | 2.1 | | | | 1.6 | | 1.7 | | | | | |
| Sulfonated Castor Oil | | | 11.6 | | 49.7 | 49.7 | 49.6 | | 11.8 | | | | | | |
| NaOH | | | 1.0 | | 0.2 | 0.2 | 0.2 | | 0.6 | | | | | | |
| Tall oil | | | | 6.3 | | | | | | | | | | | |
| Wood rosin M | | | | 8.5 | | | | | | | | | | | |
| Ethanol | 1.5 | | 8.0 | 1.7 | | | | 1.5 | 7.7 | 1.6 | | | | | |
| Water | 8.8 | 8.9 | 2.0 | 4.2 | 0.4 | 0.4 | 0.4 | 8.6 | 1.2 | 6.2 | | | | | |
| Ratio, Methyl Naphthalene to Phenol | 1.6 | 1.6 | 1.6 | 2.4 | 1.5 | 1.3 | 1.0 | 1.45 | 0.5 | 4.0 | 0 | | | | |
| Phenol Coefficient Calculated on proportion of phenol in composition | 160 | 124 | 160 | 115 | 246 | 216 | 213 | 255 | 83 | 70 | 42 | 28 | 66.7 | 38.9 | 33.3 |

E. Typhi.
[1] Methyl naphthalene was sodium refined. Contained also 4.7% diphenyl.
[2] U. S. Patent 2,085,318.

The data given in the foregoing table shows the extraordinary synergistic effect of methyl naphthalene. Considering that methyl naphthalene itself has little, if any, toxicity and the phenol coefficient substantially less than 1, it is evident that if additive effects alone were involved the phenol coefficient should not exceed substantially more than about 40. Comparative data is also given from U. S. Patent 2,085,318 as evidence of the synergistic effect obtained in applicant's compositions.

The compositions illustrated in the foregoing table are formulated in accordance with the customary practice in formulating phenolic disinfectants to give clear self emulsifiable solutions. The amount of sodium hydroxide added in all cases is insufficient to form soluble phenolates. Alcohol is added in most cases to aid in giving the desired clear solution; and in one case a small amount of diphenyl is added for this purpose. Those skilled in the art are familiar with such formulations and are able to make the customary variations without departing from the spirit and scope of the invention. The essential feature of such compositions, insofar as the invention is concerned, is that the methyl naphthalene and phenol be dissolved in a self-dispersible liquid vehicle. It is sufficient if the phenol and methyl naphthalene be dissolved in a water miscible menstruum containing a dispersing agent.

The methyl naphthalene used in the above examples was obtained by distillation of an acid washed crude methyl naphthalene. It contained alpha and beta isomers in the proportions and purity corresponding to approximately a 30° C. boiling range fraction. If desired, the proportions of isomers may be varied by crystallizing out beta isomer. Mixtures of the two isomers have the advantage of having a low melting or freezing point. Where one or more parts of dimethyl naphthalene is used for each part of phenol it is of particular advantage to use such low melting point mixtures because the danger of crystallizing out of beta isomer is thus minimized. Either the pure alpha isomer or a mixture thereof with the beta isomer containing 25% or more of the alpha isomer may be utilized with similar effect.

In the compositions of the invention of the self-dispersible type the mixture of methyl naphthalene and phenol may be considered the dispersible phase; i. e., the phase which is dispersed in the emulsion formed from such compositions. The remaining ingredients of the composition are either water soluble or of themselves water dispersible and therefore do not enter the dispersed phase in the strict sense. Generally speaking, the dispersible ingredients of the compositions should consist essentially of methyl naphthalene and the phenol. Small amounts, say, up to 5% or 10% of other ingredients may be present, but larger amounts not only act as diluents but tend to cut down the synergism. When neutral oil, for example, is substituted for methyl naphthalenes there is a substantial drop in the phenol coefficient.

I claim:

1. A bactericidal composition containing as an essential active ingredient an unsubstituted higher molecular weight phenol of the benzene series having at least one hydrocarbon substituent containing at least 3 carbon atoms in synergistic combination with methyl naphthalene at least 25% of which is the alpha isomer in the proportions of from 0.5 to 4 parts of methyl naphthalene for each part of phenol, said composition having a phenol coefficient substantially greater than the aggregate of the individual ingredients thereof.

2. A self-dispersible bactericidal composition consisting of a water dispersible phase consisting principally of methyl naphthalene at least 25% of which is the alpha isomer and an unsubstituted higher molecular weight phenol of the benzene series having at least one hydrocarbon substituent containing at least 3 carbon atoms in the proportions of 0.5 to 4 parts of methyl naphthalene for each part of phenol dissolved in a water miscible menstruum containing a dispersing agent for the dispersible phase, said composition having a phenol coefficient substantially greater than the aggregate of the individual ingredients thereof.

3. The composition of claim 2 in which the phenol is mono-tertiary-butyl meta-cresol.

4. The composition of claim 2 in which the phenol is ortho-phenyl phenol.

5. The comopsition of claim 2 in which the proportions are between 1 and 2 parts methyl naphthalene for each part of phenol.

6. The composition of claim 5 in which the phenol is mono-tertiary-butyl meta-cresol.

7. The composition of claim 5 in which the phenol is ortho-phenyl phenol.

8. A self-dispersible bactericidal compostion consisting of a water dispersible phase consisting principally of methyl naphthalene at least 25% of which is the alpha isomer and an unsubstituted higher molecular weight phenol of the benzene series having at least one hydrocarbon substituent containing at least 3 and not more than 7 carbon atoms in the proportions of 0.5 to 4 parts of methyl naphthalene for each part of phenol dissolved in a water miscible menstruum containing a dispersing agent for the dispersible phase, said composition having a phenol coefficient substantially greater than the aggregate of the individual ingredients thereof.

9. The composition of claim 8 in which the proportions are from 1 to 2 parts of methyl naphthalene for each part of phenol.

10. The composition of claim 1 in which the phenol is selected from the class consisting of propyl and isopropyl phenols, tert-butyl-phenol, tert-butyl-meta-cresol, ortho-amyl-phenol, ortho-phenyl-phenol, ortho- and para-benzyl-phenols, and para-tert-amyl-phenol.

11. The composition of claim 10 in which the phenol is selected from the class consisting of para-tert-butyl-meta-cresol and ortho-phenyl-phenol.

12. The composition of claim 11 in which the phenol is mono-tertiary-butyl-meta-cresol.

13. The composition of claim 11 in which the phenol is ortho-phenyl-phenol.

14. The composition of claim 11 in which the proportions are between 1 and 2 parts methyl naphthalene for each part of phenol.

15. The composition of claim 14 in which the phenol is mono-tertiary-butyl-meta-cresol.

16. The compostion of claim 14 in which the phenol is ortho-phenyl-phenol.

17. A bactericidal composition containing as an essential active ingredient a nuclear hydroxylated benzene hydrocarbon having at least one hydrocarbon substitutent containing at least 3 carbon atoms in synergistic combination with methyl naphthalene at least 25 per cent of which is the alpha isomer in the proportions of from 0.5 to 4 parts of methyl naphthalene for each part of phenol, said composition having a phenol coefficient substantially greater than the aggregate of the individual ingredients thereof.

18. A bactericidal composition containing as an essential active ingredient a higher molecular weight phenol having a molecular weight from 121 to 170 and being constituted as a nuclear hydroxylated benzene hydrocarbon having at least one hydrocarbon substituent containing at least 3 carbon atoms in synergistic combination with methyl naphthalene at least 25 per cent of which is the alpha isomer in the proportions of from 0.5 to 4 parts of methyl naphthalene for each part of phenol, said composition having a phenol coefficient substantially greater than the aggregate of the individual ingredients thereof.

HUBERT G. GUY.

REFERENCES CITED

The following references are of record in the file of this patent:

UNITED STATES PATENTS

| Number    | Name          | Date           |
|-----------|---------------|----------------|
| 1,230,648 | Barrett       | June 19, 1917  |
| 2,085,318 | Klarmann      | June 29, 1937  |
| 2,289,476 | Badertscher   | July 14, 1942  |
| 2,347,265 | Hyman         | Apr. 25, 1944  |
| 2,411,530 | Dreisbach et al. | Nov. 26, 1946 |

OTHER REFERENCES

Wadley, U. S. D. A. Bulletin ET-223 entitled "The Evidence Required to Show Synergistic Action of Insecticides and a Short Cut in Analysis," June 1945, pages 1-6.